United States Patent [19]

Ferrari

[11] 3,995,268

[45] Nov. 30, 1976

[54] VEHICLE ALARM

[75] Inventor: Francis E. Ferrari, LaGrange, Ill.

[73] Assignee: Stewart-Warner Corporation, Chicago, Ill.

[22] Filed: Oct. 24, 1974

[21] Appl. No.: 517,409

[52] U.S. Cl. .......................... 340/384 E; 340/52 R; 331/47
[51] Int. Cl.² ............................................ G08B 3/00
[58] Field of Search ......... 340/384 E, 384 R, 309.1, 340/52 D, 52 E, 52 R, 63; 331/47, 35, 173; 328/63; 58/23 AC; 235/92 T; 307/10 SB

[56] References Cited
UNITED STATES PATENTS

| | | |
|---|---|---|
| 3,283,254 | 11/1966 | Haynie .............................. 331/55 X |
| 3,460,136 | 8/1969 | Jambazian ...................... 340/384 E |
| 3,858,175 | 12/1974 | Kopera ........................... 340/223 X |

*Primary Examiner*—John W. Caldwell
*Assistant Examiner*—William M. Wannisky
*Attorney, Agent, or Firm*—McDougall, Hersh & Scott

[57] ABSTRACT

An alarm device for use in a vehicle which utilizes an audio frequency oscillator to drive a buzzer or tone device audible to the occupants of the vehicle. The alarm includes a control circuit which automatically stops the alarm after a preselected interval and may include modulated or interrupted alarm.

10 Claims, 6 Drawing Figures

VEHICLE ALARM

BACKGROUND OF THE INVENTION

This invention relates to alarm circuits and in particular to alarm circuits adapted for use in vehicles. With the advent of the modern automobile at the end of the second World War, the electronic arts have provided for a variety of warning devices adapted to detect malfunctions or dangerous conditions in a vehicle. For example, passenger automobiles have long hand ammeters to detect a weak battery condition, temperature gauges to detect overheating of the cooling system, and oil gauges to detect loss of oil pressure. Some or all of these devices have been electrical, utilizing electric currents and sensing circuits to provide the necessary indications. In the case of trucks, the particular conditions to be monitored may differ, but the end indications are the same: generally a light, gauge or buzzer is actuated to indicate an unsafe condition.

In recent years, due in large part to federal legislation, passenger vehicles have been equipped with seat belt warning devices serving as remainders to use seat belts or, in the case of late models, enforcing use of the seat belts prior to permitting operation of the vehicle. Many of these latter types of alarms have been of the buzzer or tone alarm variety. Such an alarm utilizes a common buzzer to generate an audible tone when the electronic circuit to which it is connected detects the absence of a necessary condition in the vehicle. An electronic interlock may be incorporated whereby if a driver does not follow a prescribed sequence, the starter motor is electronically disconnected from the battery and an alarm is energized, indicating the failure to follow the required procedure. Additionally, if a passenger is seated next to the driver, the system also requires that this passenger buckle up before the alarm will stop.

While the above described warning system has met with some success, there is a great deal of objection to its mandatory aspects. Furthermore, a serious problem has been encountered wherein only one person is inside the vehicle but a package or other heavy object is placed on the seat next to him. The package usually cannot be strapped in, but nevertheless the tone alarm circuit detects its presence and is fooled into believing that a nonexistent person occupies the seat. Accordingly, the alarm circuit is energized resulting in a continuous buzzing in a passenger compartment. This can be distracting and unsafe and has resulted in a number of new car purchasers attempting to completely defeat the entire warning system.

In view of the problems with present alarm systems, certain modifications have been proposed. A first modification would include removal of the mandatory starting procedure as a condition for connecting the starter motor to the battery. Of particular interest to the present invention, however, is a proposal to provide a self-defeating or automatic turnoff alarm system. Such a system would sound an alarm if seat belts are not buckled. However, if the condition continues after a predetermined period, the alarm would cease and reset itself for subsequent use. The vehicle alarm systems presently available do not possess such a capability. It is to be pointed out that vehicle alarm systems typically must run on a 6- or a 12-volt battery system and be capable of withstanding extreme temperature ranges, require little service, and be low in cost.

It is accordingly an object of the present invention to provide a vehicle alarm circuit which shuts off after a preselected period.

It is another object of the present invention to provide an improved vehicle alarm circuit which provides an interrupted tone.

Other objects and advantages of the present invention will become apparent from the concluding portion of the specification.

DETAILED DESCRIPTION

Figure 1:
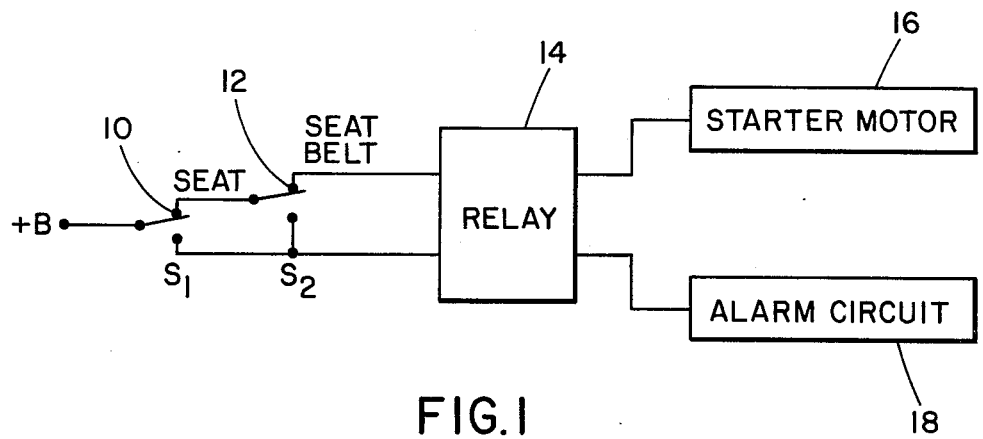
FIG. 1 is a schematic diagram of a typical automobile alarm system utilizing an alarm circuit according to the present invention.

Referring now to FIG. 1, a simplified schematic diagram indicating the environment in which the present invention is utilized is illustrated. It will of course be recognized that the alarm circuit of the present invention can be utilized for such diverse automotive applications as detecting leaking coolant, low battery, low fuel, loss of engine coolant, low oil pressure and various other uses in addition to the illustrated seat belt usage of FIG. 1. In FIG. 1, a pair of switches S1 and S2 are serially arranged. As indicated, S1 may be a seat actuated switch in an automobile whereby a person or object placed upon the seat actuates the switch to connect it to the upper terminal 10. Switch S2 is actuated when a seat belt is buckled, thereby connecting to the upper terminal 12. Thus, when both conditions exist, namely a seat has an object on it and a seat belt has been buckled, a relay 14 or other appropriate switching device is operated. Failure of either the seat or seat belt switches to be placed in their upper position causes or maintains the relay in a low state. In a high state, the starter motor 16, for example, is permitted to operate. When the desired conditions do not exist, the starter motor is rendered inoperative and the alarm circuit 18 is activated. Obviously other arrangements are possible as desired.

Figure 2:
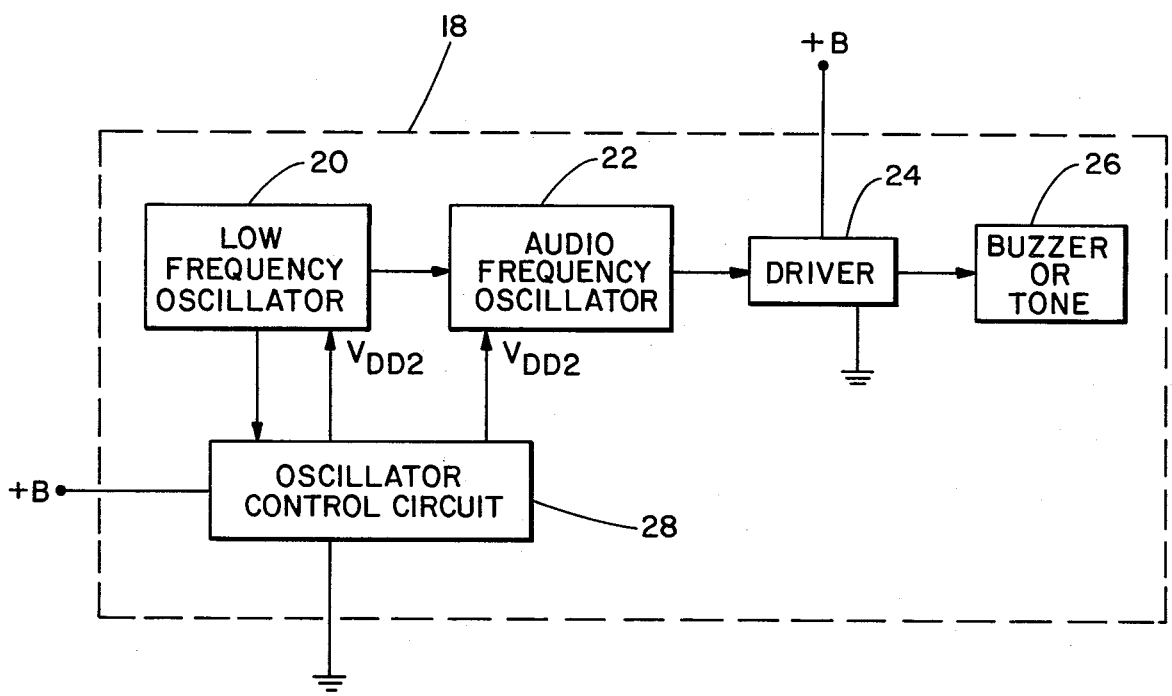
FIG. 2 is a block diagram of the alarm circuit of the present invention.

Referring now to FIG. 2, a block diagram of the alarm circuit according to the present invention is illustrated. The alarm circuit according to the first embodiment includes a pair of oscillators 20 and 22. The output of oscillator 22 is provided to a driver circuit 24 which in turn drives a buzzer or mechanical tone device 26.

Oscillator 20 is desirably a low frequency oscillator and functions for a purpose to be described. By "low frequency" it is intended to indicate a frequency range of approximately 1 to 100 Hz. For the particular example disclosed herein, the low frequency oscillator is a 4 Hz oscillator.

Oscillator 22 is desirably an audio frequency oscillator. By "audio frequency oscillator" it is meant an oscillator which has a frequency of oscillation in the range detectable by a human ear. Thus, it is intended to indicate a range of roughly 100 Hz to 10,000 Hz. For the particular example illustrated in the present disclosure, the audio frequency oscillator has a frequency of approximately 1,600 Hz.

Controlling power to the oscillators 20 and 22 is a control circuit 28. As will be described, this circuit shuts off the buzzer 26 after a preselected interval of operation. According to a first embodiment the control circuit 28 may be a digital counter circuit which shuts off power to the oscillators after detecting a preselected number of oscillations of either the oscillator 20 or 22 depending upon the mode of operation. In an alternate embodiment, the control circuit 28 may comprise an RC timing circuit. As indicated in FIG. 2, the circuit is turned on by the application of power to the oscillator control circuit 28 and the driver 24. The control circuit supplies power to the oscillators 20 and 22. After the preselected period of operation, the control circuit removes power from the oscillators 20 and 22 to discontinue operation of the buzzer 26 until the circuit is again actuated by application of power to the control circuit after at least a momentary interruption thereof.

Figure 3:
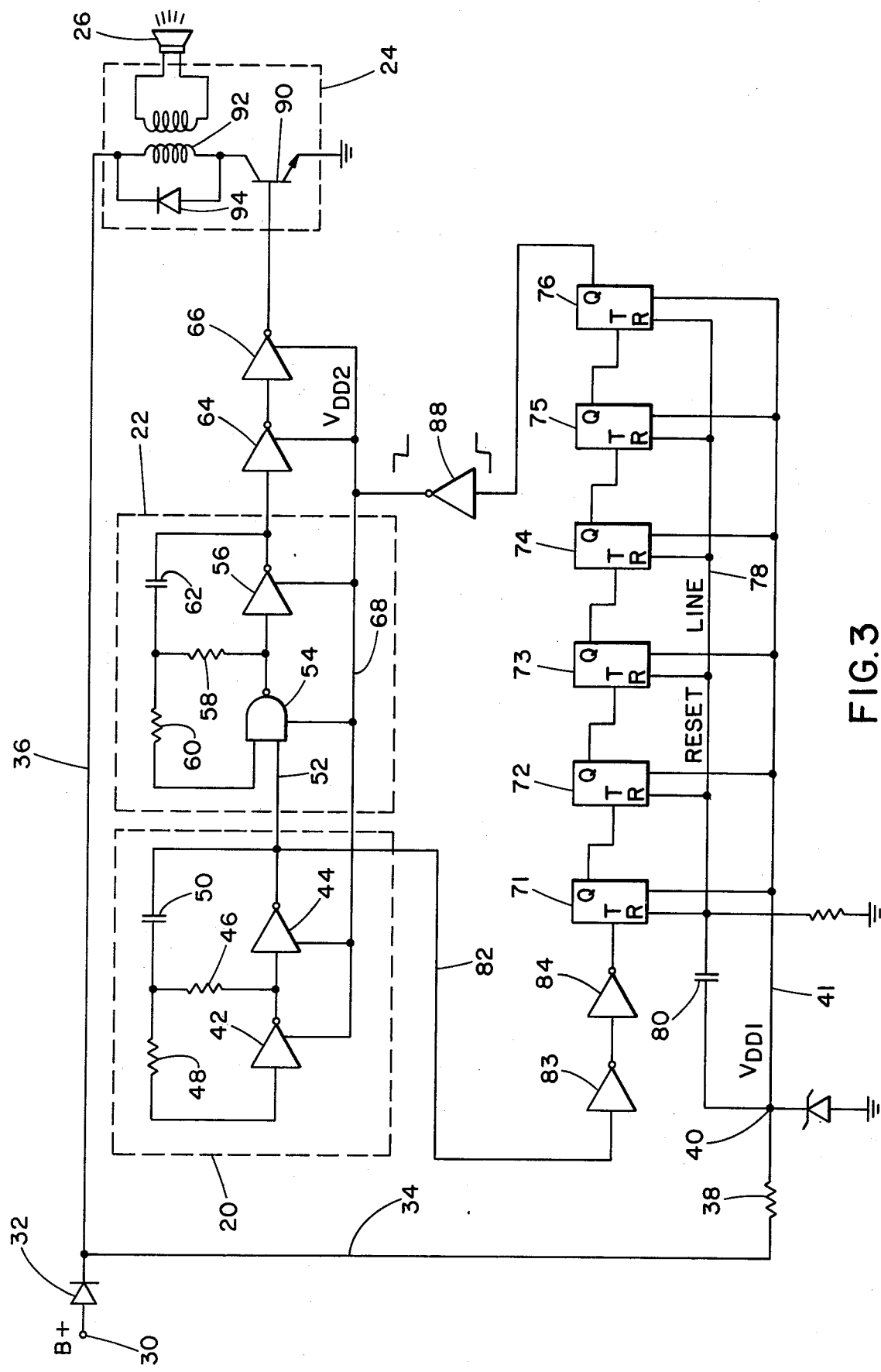
FIG. 3 is a schematic diagram of the alarm circuit of the present invention according to a first embodiment.

Referring now to FIG. 3, a schematic diagram of an alarm circuit according to the present invention is illustrated. Power is supplied to the circuit from terminal 30. This terminal is connected through any desired switching circuit to the positive terminal of the vehicle battery. A diode 32 is provided to prevent reverse current flow through the terminal 30. From terminal 30 the car voltage, whether it be 6 or 12 volts, is supplied to the alarm circuit via line 34 to the control circuit 28 and line 36 to the driver circuit 24. A current limiting resistor 38 is provided in series between the battery terminal 30 and terminal 40 of the control circuit. Terminal 40 provides operating voltage to each counter unit on line 41.

The low frequency oscillator 20 is formed by a pair of inverting amplifiers 42 and 44. Connecting the output of amplifier 42 to its input is a feedback path including resistors 46 and 48. Similarly, a feedback path from the output to the input of amplifier 44 includes a capacitor 50 and resistor 46. The output of the oscillator 20 is taken on line 52. As will be apparent to those skilled in the art, the low frequency oscillator 20 can be set to provide a desired oscillation frequency by selecting appropriate values for resistors 46, 48 and capacitor 50. For the present example its oscillatory frequency has been selected as 4 Hz and therefore the values of resistors 46 and 48 would be approximately 2.7 M ohms and 5.6 M ohms. The value of capacitor 50 would be approximately 0.047 microfarads.

The output of the low frequency oscillator on line 52 is provided as one input to a Nand gate 54. Nand gate 54 and inverting amplifier 56 with a feedback network form the audio frequency oscillator 22. Connected from the output of Nand gate 54 to one of its inputs are feedback resistors 58 and 60. Connected between the output and input of inverting amplifier 56 is capacitor 62 and resistor 58. In the manner described for the low frequency oscillator 20, the audio frequency oscillator 22 is set to produce a desired oscillator frequency in the audio range. For the specific example chosen in this specification, an oscillatory frequency of 1,600 Hz is desired. In order to obtain these values, the resistors 58 and 60 are conveniently chosen to be approximately 650 K ohms and 1.5 M ohms. The capacitor 62 is chosen as 390 picofarads.

Considering the operation of the oscillators 20 and 22, it will be apparent that the low frequency oscillator 20 controls the operation of the audio frequency oscillator 22. Stated differently, the low frequency oscillator 20 modulates the audio frequency oscillator 22. This can be seen by reference to the wave forms illustrated in FIG. 6. This arrangement produces a beeping or interrupted tone rather than a steady tone. It will therefore be apparent that if the oscillator 20 is eliminated as described in connection with FIG. 4, a steady tone will result.

The output of the oscillator 22 is provided to an inverting amplifier 64 in series with amplifier 66. Amplifier 64 serves as an isolating amplifier while amplifier 66 produces the desired logic level (off). All of the inverting amplifiers 42, 44, 56, 64, 66 as well as Nand gate 54 are connected to a common bus 68 to which the operating voltage is applied. It will be observed that the operating bus 68 is controlled by the control circuit 28; thus, by removing power from bus 68 the oscillators can be turned on and off as desired.

Referring now to the control circuit 28, according to a first embodiment the circuit comprises a digital counting circuit whereby when the counting circuit reaches its capacity a signal is generated deenergizing the bus 68. The counting circuit is reset and begins counting anew each time the alarm circuit is reenergized.

The counter circuit 28 in the embodiment illustrated comprises serially connected flip-flops 71–76. It will of course be apparent that a greater or lesser number of flip-flops can be provided to obtain the desired preselected counting limit.

The flip-flops are preferably D latch type flip-flops, although RS or JK flip-flops can also be used. Each flip-flop has its Q output connected to the toggle input of the next stage. The reset input of the flip-flops are connected to a common line 78 which in turn is connected to one side of a capacitor 80. The other side of capacitor 80 is connected to the terminal 40 thereby to generate a pulse across the capacitor 80 each time power is applied to the control circuit effective for resetting all of the flip-flops 71–76.

The input to flip-flop 71 is the output from the low frequency oscillator 20 provided via line 82 and a pair of inverting amplifiers 83 and 84. Amplifier 83 provides isolation between the circuit components while amplifier 84 provides the polarity inversion necessary for negative logic transitions when negative logic elements are utilized. The output from the flip-flops 71–76 is taken on the Q output of flip-flop 76 via line 86 and is provided via inverting amplifier 88 to the power bus 68 of the oscillators.

The output from the oscillator 22 via the amplifiers 64 and 66 is applied to the base of transistor 90. Transistor 90 operates as an electronic switch making and breaking a complete circuit from the plus side of the battery on line 36 through an inductive coil 92 and the collector emitter path of transistor 90 to ground. It will of course be apparent that the transistor switch operates at the oscillatory frequency of oscillator 22. Inductively coupled to the coil 92 is the electromechanical buzzer, its particular construction, size, etc. forming no part of the present invention. Further, it will be apparent that piezoelectric buzzers and the like can be similarly controlled by the present invention. Connected in parallel with the coil 92 is a diode 94 to eliminate flyback voltage.

Figure 6:
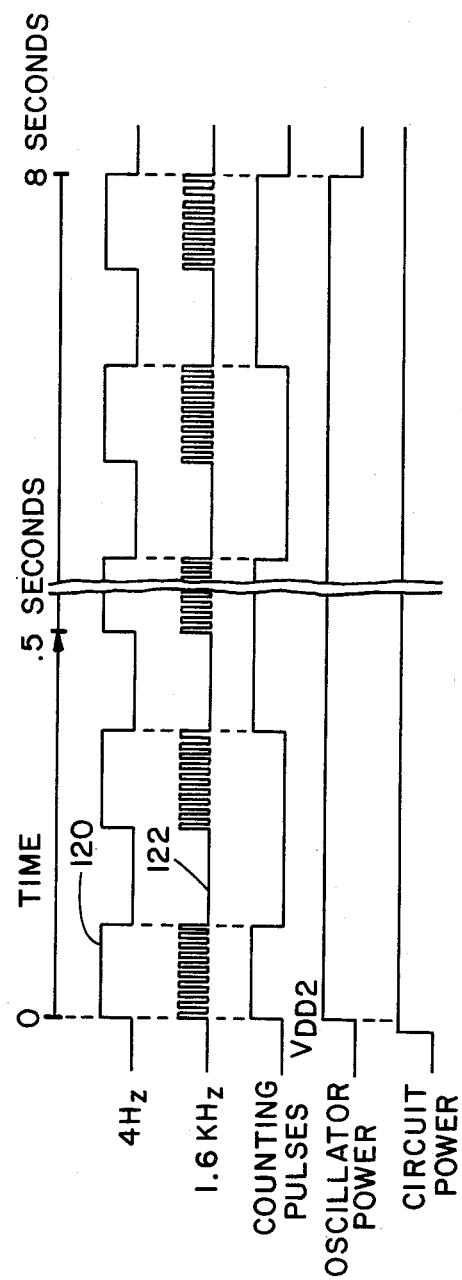
FIG. 6 is a wave form diagram illustrating the time relationship of the various signals generated by the FIG. 3 circuit.

Considering the operation of the FIG. 3 circuit and with particular reference to the timing diagrams illustrated in FIG. 6, it will be apparent that when the alarm circuit is energized, a pulse is produced across capacitor 80 resetting the flip-flops 71–76. These flip-flops will then be in their low state, i.e., their Q output will be low. A low Q output at flip-flop 76 produces a high output from inverter 88. In turn this energizes bus 68 permitting the oscillators 20 and 22 to begin operation. Oscillator 20 enables Nand gate 54 causing oscillator 22 to produce the 1.6 K Hz signal for operating the switching transistor 90. Switching transistor 90 then turns on and off producing a buzz readily detected by the human ear. When the 4 Hz oscillator goes low, Nand gate 54 interrupts operation of the oscillator 22 until the next cycle of the 4 Hz oscillator when oscillator 22 is again turned on by operation of gate 54.

The output of oscillator 20 is also connected via line 82 to the toggle input of flip-flop 71. Thus, each oscillation of oscillator 20 operates the flip-flops 71–76. Each time the 4 Hz signal goes low, a low signal is applied to the toggle input of flip-flop 71. The first time this happens, flip-flop 71 changes its output state from low Q to high Q. Since the flip-flops 71–76 react only to a negative going signal, this action does not change the state of flip-flop 72. The next negative going signal applied to the toggle input of flip-flop 71 causes it to change state from a high Q output to a low Q output. This operates flip-flop 72 causing it to change to a high Q output. In this manner succeeding negative going pulses from the oscillator 20 are in effect counted in binary by the flip-flop array 71–76.

When the final flip-flop 76 receives a singal causing it to change state from a low Q to a high Q output, the inverting amplifier 88 removes power from bus 68, thereby disabling the oscillators 20 and 22. As indicated in FIG. 6, this terminates operation of the oscillators until the counters are reset even though power is still applied to the alarm circuit.

In this manner, a tone or buzzer alarm circuit is provided which will turn on when the detected condition activates the circuit and remain on for a period sufficient to alert the vehicle operator to that condition and then automatically turn off after the appropriate preselected interval even though the condition remains. As stated, when a new signal is received by the control circuit, flip-flops 71–76 are reset to the low state by capacitor 80 thereby preparing the counters to begin a new operational cycle. By providing six counters 71–76 the circuit will shut off after the oscillator 20 has gone through $2^5$ cycles. By providing greater or fewer stages of flip-flops the turn-off time can be varied as desired. A further method of varying the turn-off time is to vary the operating frequency of the low frequency oscillator 20. Also, hexidecimal or decimal counters can be utilized if desired.

Figure 4:
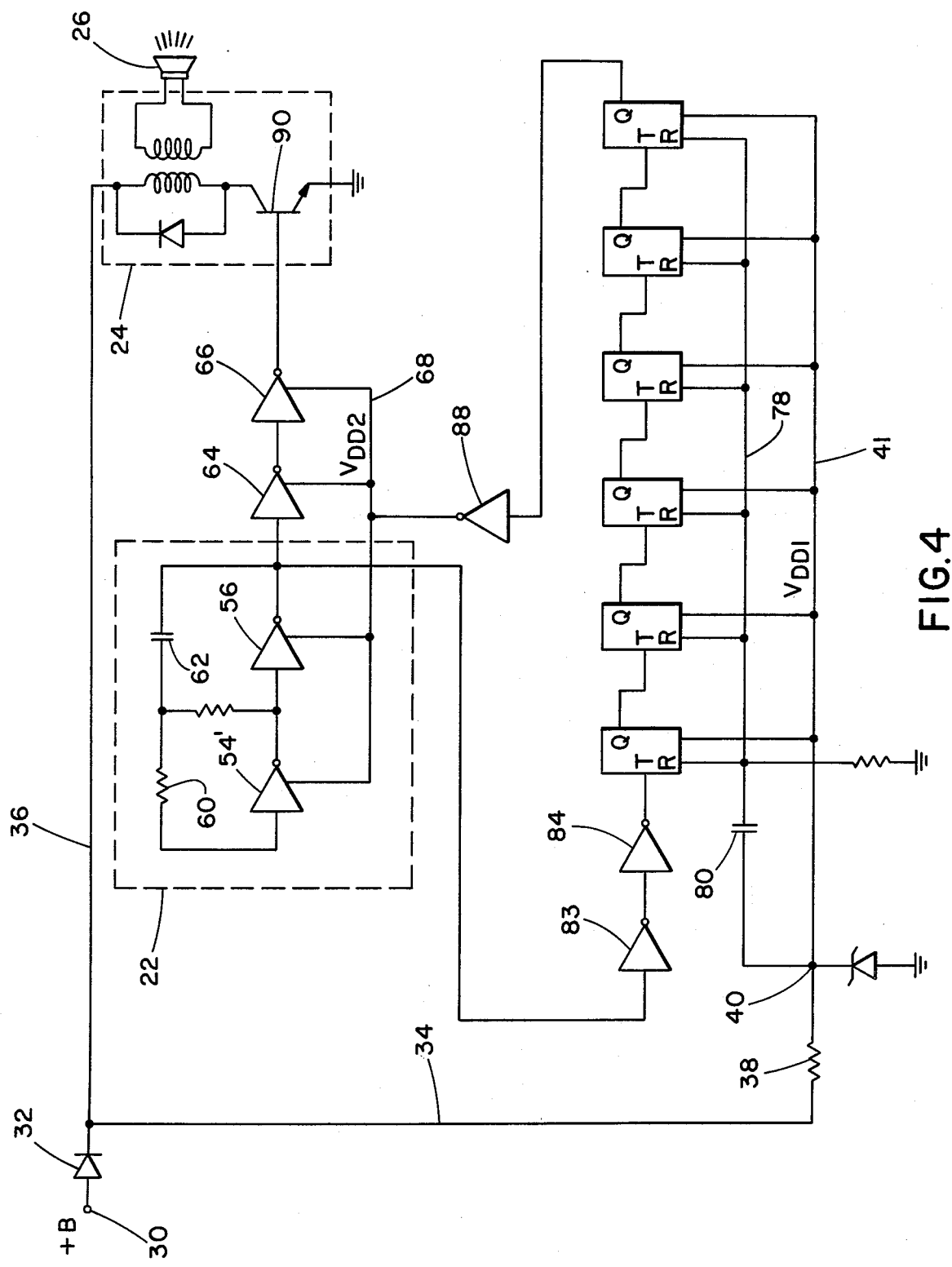
FIG. 4 is a schematic diagram of the alarm circuit of the present invention according to a second embodiment.

Referring now to FIG. 4, a modified embodiment of the circuit of FIG. 3 is disclosed. In this embodiment the low frequency oscillator 20 is omitted, the circuit in all other respects, however, remaining the same. In this embodiment, a continuous tone or buzz is produced by the buzzer rather than an interrupted or modulated tone frequently referred to as a "beep". In this embodiment the control circuit receives the output of the audio frequency oscillator 22 as the input to the flip-flops. As will be apparent, if the same on time is desired, it is necessary to provide a larger number of counting stages since the counting will be much higher than in the FIG. 3 embodiment. As in the FIG. 3 embodiment, when the counter reaches its maximum count, it produces a high output on the last flip-flop through the inverter 88 causing the power bus 68 to go low and turning off the oscillator 22.

Figure 5:
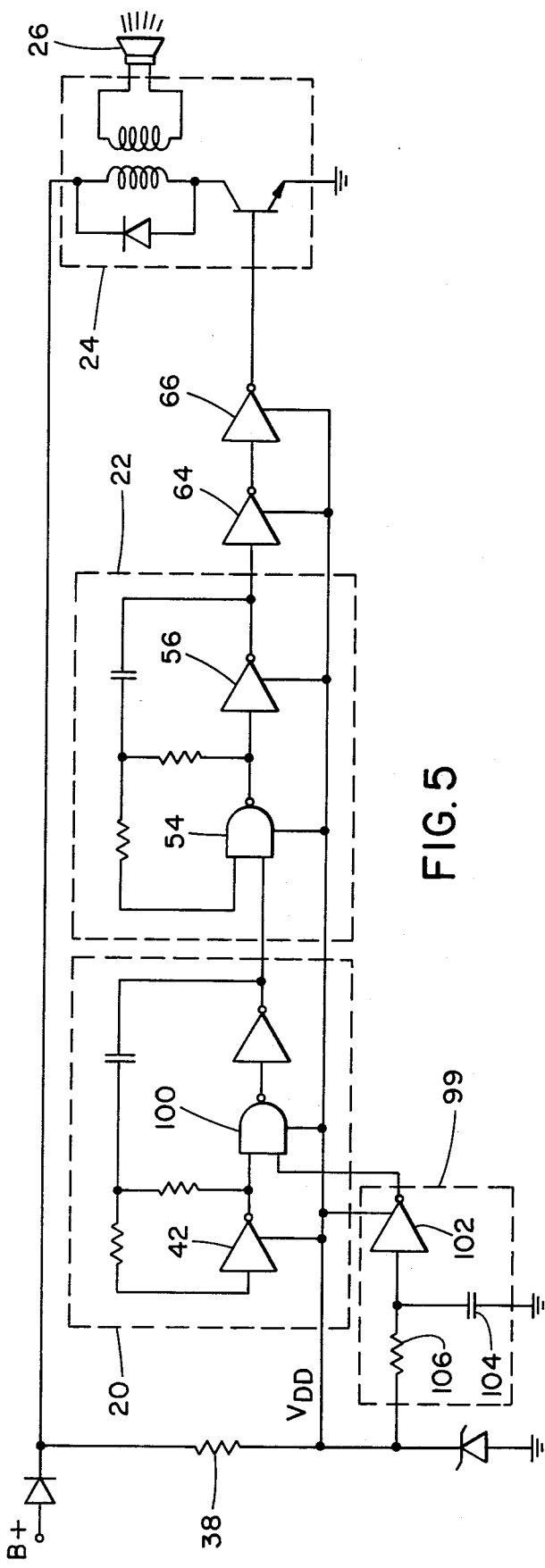
FIG. 5 is a schematic diagram of a third embodiment of the invention.

Referring now to FIG. 5, a third embodiment of the invention is disclosed. In this embodiment the interrupted tone is again produced with low frequency oscillator 20 modulating audio frequency oscillator 22. In this embodiment, however, instead of a binary counter to control the turn-off of the oscillators an analog method is utilized. An RC time constant circuit 99 is connected as one input to a Nand gate 100 through an inverting amplifier 102. The RC time constant circuit comprises a capacitor 104 and a resistor 106. When no voltage is present at terminal 30 the oscillators are off. When power is applied to the alarm circuit it is applied to amplifiers 42, 56, 64 and 66 as well as Nand gates 100 and 54 via line 108. This commences operation of the interrupted tone. At the same time, the capacitor 104 begins charging through resistor 106 until it approaches the supply voltage. As capacitor 104 charges, th voltage on it is applied as an input to inverting amplifier 102. When this voltage exceeds the threshold voltage of the amplifier it changes state, i.e., its output goes low. This disables Nand gate 100 effective for turning off both oscillators. As will be apparent, by selecting the values of resistor 106 and capacitor 104 the operating time of the oscillators can be set as desired.

Referring now to FIG. 6, a timing diagram for the FIG. 3 embodiment is illustrated. The top waveforms represents the period of elapsed time from an initial turn-on point of the circuit. The second waveform 120 is the output of the 4 Hz oscillator 20 while waveform 122 is the output of the audio oscillator 22. Waveform 124 are the pulses supplied to the flip-flops on the trailing edge of the low frequency oscillation waveform. Waveform 126 illustrates the voltage level on the bus 68 while waveform 128 illustrates the power supply to the alarm circuit.

It will be apparent to those skilled in the art that the devices disclosed in the present application can be manufactured from discrete components if desired. It will also be recognized that preferably these devices will be manufactured using the latest technology available as, for example, fabricating the circuit as a large scale integrated circuit for incorporation into miniaturized tone devices which can be installed under the dashboard of automobiles and trucks. In the latter case the operational amplifiers, flip-flops and other logic elements would not be discrete components but part of the chip. The only discrete components in such a case would be the driver circuit 24, the feedback resistors and capacitors for the oscillators, and the buzzer. Using such a technique, it is possible to significantly reduce the cost of such a circuit and it is contemplated by the present disclosure to so manufacture the devices.

While I have shown and described embodiments of this invention in some detail, it will be understood that this description and illustrations are offered merely by way of example, and that the invention is to be limited in scope only by the appended claims.

I claim:

1. A vehicle warning alarm circuit producing an audible signal from a buzzer in response to an electrical signal indicating the occurrence of a selected condition, comprising:
- a. means for generating a selected audio signal when enabled and energized;
- b. means for generating a low frequency signal, said low frequency signal enabling said audio signal generating means to produce an interrupted audio signal;
- c. means for energizing both of said generating means;
- d. means for applying said interrupted audio signal to said buzzer to produce said audible signal; and
- e. means for deenergizing both of said generating means after a selected period of operation.

2. The device of claim 1 wherein said means for applying includes:
- a. a semiconductor switch connected between a source of voltage and ground receiving said audio frequency signal and switching between a conducting and nonconducting state in response to said audio frequency signal; and
- b. a coil in series with said semiconductor switch inductively coupled to said buzzer to produce said audible signal.

3. The device of claim 1 wherein said means for energizing includes means receiving said electrical signal for resetting said deenergizing means thereby to energize both of said generating means for said selected period.

4. The device of claim 1 wherein said deenergizing means includes means for counting the cycles of said low frequency signal and deenergizing both of said generating means when the cycle count exceeds a selected value.

5. The device according to claim 4 wherein said means for counting are a plurality of serially connected flip-flops and said selected value is the number of cycles necessary to operate the last flip-flop in the series.

6. The device according to claim 5 wherein operation of said last flip-flop deenergizes both of said generating means, said means for energizing being effective for resetting said flip-flops.

7. A vehicle warning alarm circuit producing an audible signal from a buzzer in response to an electrical signal indicating the occurrence of a selected condition, comprising:
- a. means fo generating a selected audio signal when enabled and energized;
- b. means for generating a low frequency signal said low frequency signal enabling said audio signal generating means to produce an interrupted audio signal;
- c. means for energizing both of said generating means;
- d. means for applying said interrupted audio signal to said buzzer to produce said audible signal; and
- e. means for disabling said low frequency generating means to thereby disable said audio signal generating means after a selected period of operation.

8. The device of claim 7 wherein said means for applying includes:
- a. a semiconductor switch connected between a source of voltage and ground receiving said audio frequency signal and switching between a conducting and nonconducting state in response to said audio frequency signal; and
- b. a coil in series with said semiconductor switch inductively coupled to said buzzer to produce said audible signal.

9. The device of claim 7 wherein said means for disabling said low frequency generating means includes:
- a. an RC network which charges up to a positive voltage level upon receipt of said electrical signal; and
- b. logic means for disabling operation of said low frequency generating means when said RC network reaches a preselected voltage level.

10. The device of claim 9 wherein the logic means is an inverting amplifier whose in put is connected to said RC network and whose output controls the operation of said low frequency generating means.

* * * * *